(12) United States Patent
Kim

(10) Patent No.: US 11,296,596 B1
(45) Date of Patent: Apr. 5, 2022

(54) NOISE REDUCTION CIRCUIT FOR VOLTAGE REGULATOR

(71) Applicant: NXP B.V., Eindhoven (NL)

(72) Inventor: Geunwook Kim, Seoul (KR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/179,161

(22) Filed: Feb. 18, 2021

(51) Int. Cl.
*H02M 1/44* (2007.01)
*H02M 3/155* (2006.01)

(52) U.S. Cl.
CPC ............ *H02M 1/44* (2013.01); *H02M 3/155* (2013.01)

(58) Field of Classification Search
None
See application file for complete search history.

(56) References Cited

U.S. PATENT DOCUMENTS

| | | | |
|---|---|---|---|
| 6,414,537 B1 * | 7/2002 | Smith | G05F 1/468 327/538 |
| 7,777,559 B2 | 8/2010 | Chou | |
| 8,710,811 B2 * | 4/2014 | Wan | G11C 5/147 323/280 |
| 8,922,267 B2 | 12/2014 | Peschke et al. | |
| 8,981,750 B1 * | 3/2015 | Meher | G05F 1/575 323/282 |
| 9,372,491 B2 * | 6/2016 | Bhattad | G05F 1/575 |
| 10,656,664 B1 * | 5/2020 | Sato | H02M 3/07 |
| 10,768,646 B2 * | 9/2020 | Yang | G05F 1/575 |

* cited by examiner

*Primary Examiner* — Jeffery S Zweizig

(57) ABSTRACT

A voltage regulator circuit comprises a regulator output; an amplifier that is activated in response to a first signal and inactivated in response to a second signal, the error amplifier having a first input for receiving a reference voltage, a second input for receiving a feedback voltage, and an output that generates a differential with respect to the reference voltage and the feedback voltage; an active discharging transistor that, in response to a falling slope of the electronic signal, discharges a present electronic signal at the regulator output; and a first switch at the output of the amplifier that is in open state in response to a receipt of the second signal to disconnect a coupling capacitor path between the regulator output and the reference voltage to negate an effect of noise on the reference voltage in response to the falling slope of the electronic signal.

20 Claims, 4 Drawing Sheets

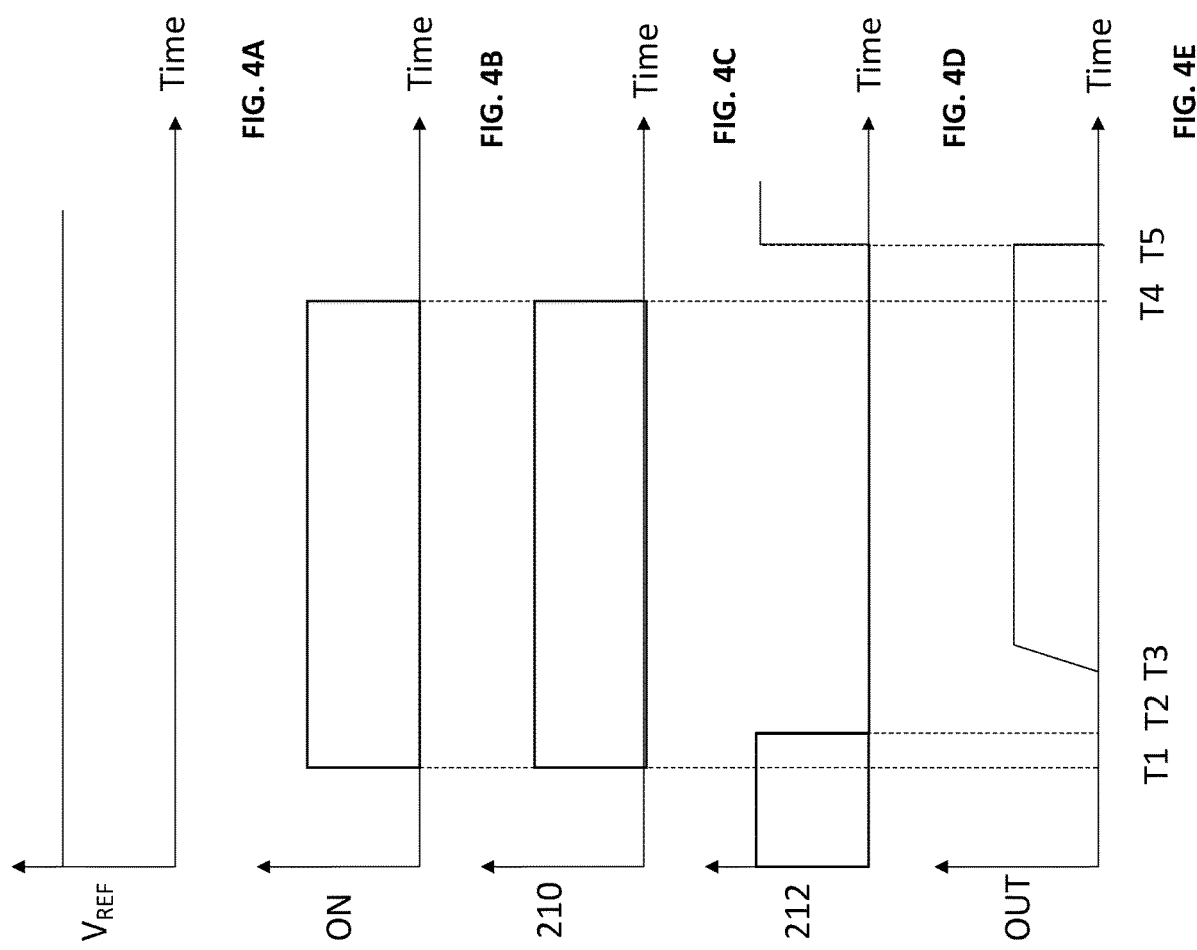

NOISE REDUCTION CIRCUIT FOR VOLTAGE REGULATOR

FIELD

The present disclosure relates generally to integrated electronic semiconductor devices including voltage regulators, and more specifically to a circuit that minimizes noise at the output of a voltage regulator without affecting a reference voltage at the input of the regulator.

BACKGROUND

Voltage regulators are found in electronic devices virtually every device in order to control and regulate voltage from a power source to a load, in particular, proving circuitry to monitor and limit current to the load. In modern electronic devices, multiple regulators may be implemented as integrated circuits (ICs) on a computer chip. Here, a reference voltage may be shared with multiple regulators. It is desirable that the output of any of the multiple regulators does not affect the reference voltage, for example, a reference voltage that does not vary with kickback noise.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIGS. 4A-4E are collectively a timing chart including a set of relevant waveforms describing an operation of the voltage regulator circuit illustrated in FIG. 2.

DETAILED DESCRIPTION

Figure 1:
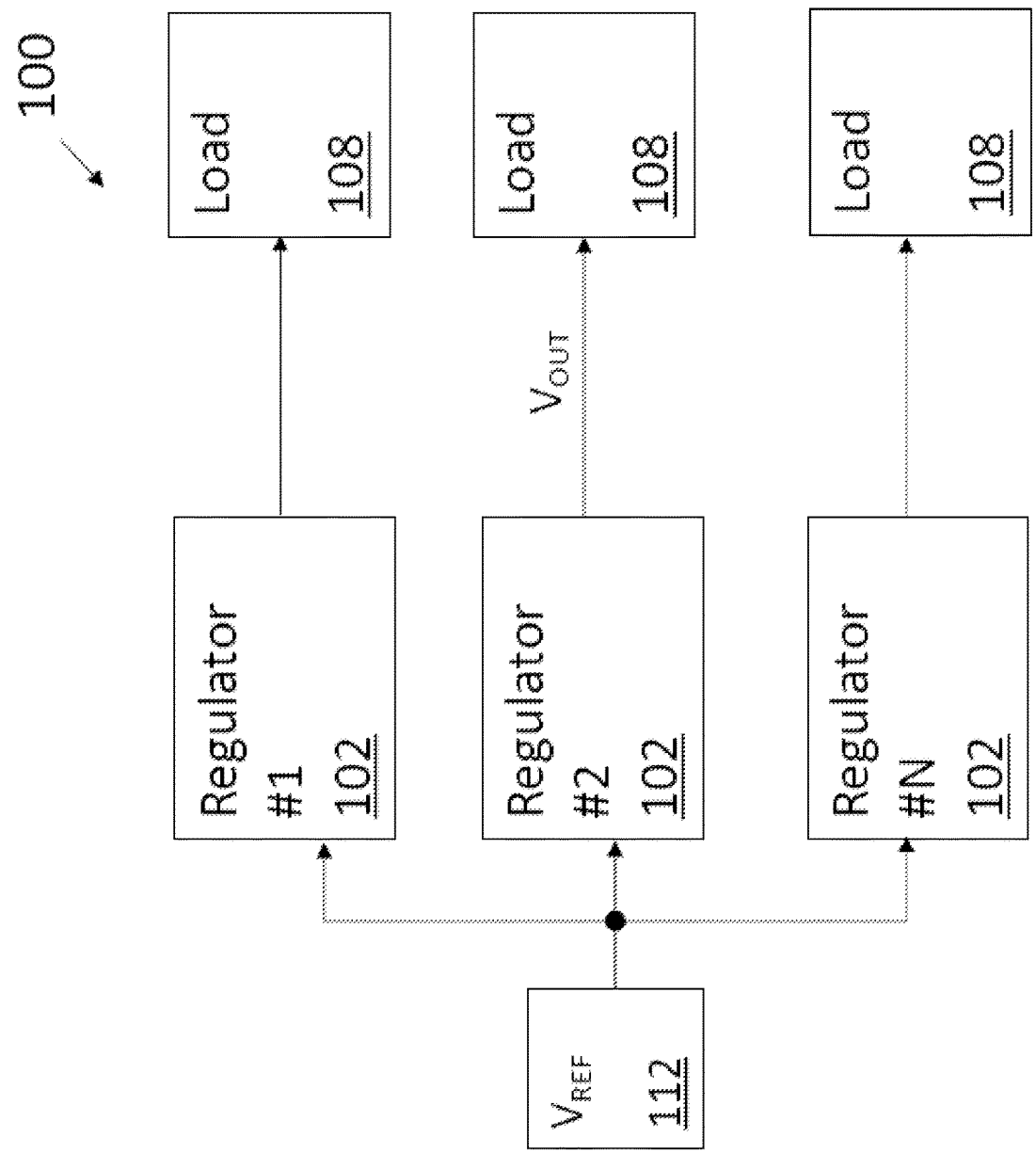
FIG. 1 is a block diagram of a conventional integrated circuit including a plurality of voltage regulators in communication with a load circuit.

An output voltage from one regulator of an integrated circuit to a load circuit that fluctuates due to noise may impact the other regulators constructed and arranged in parallel. As shown in FIG. 1, a conventional integrated circuit includes a plurality of voltage regulators 102 that share a reference voltage $V_{REF}$ from a voltage reference circuit 112 that regulates a voltage from a power source and output as an output voltage $V_{OUT}$ to a load circuit 108, e.g., an analog-to-digital converter (ADC) circuit or other converter configured to provide a regulated DC output voltage to the load circuit 108. However, noise can occur at the output of a particular voltage regulator 102, which can affect a reference voltage shared by the voltage regulators. Accordingly, the voltage regulators 102 may not accurately process a received input reference voltage due to the presence of noise at an output of another voltage regulator.

Various techniques are well-known for reducing noise from the output of a voltage regulator. One technique is to include a low-pass filter to the output of the voltage reference circuit 112 to mitigate the noise from the output. However, this configuration does not eliminate the undesirable noise.

Another technique is to add buffers or the like, which may be more effective than low-pass filters for eliminating noise from the output. However, in a highly integrated low power chip, the buffers require additional undesirable power and chip resources such as layout area. Other kickback noise reduction techniques also require additional circuits providing additional filters and buffers requiring further power consumption in order to draw additional bias current to mitigate the noise from a load circuit. Such circuits at the regulator output also provide additional offsets that can further affect the accuracy of the circuit, for example, by causing variability in the output voltage.

In brief overview, embodiments of the present inventive concept include an additional circuit that eliminates noise from the output of a voltage regulator, which can accommodate a highly integrated computer chip with respect to low power requirements and layout area. In doing so, the voltage regulator can prevent or reduce signal disturbances from occurring in the load circuit and therefore reduce the risk of instability in integrated electronic semiconductor devices that includes one or more voltage regulator circuits, and regardless whether they share a common reference voltage.

Figure 2:
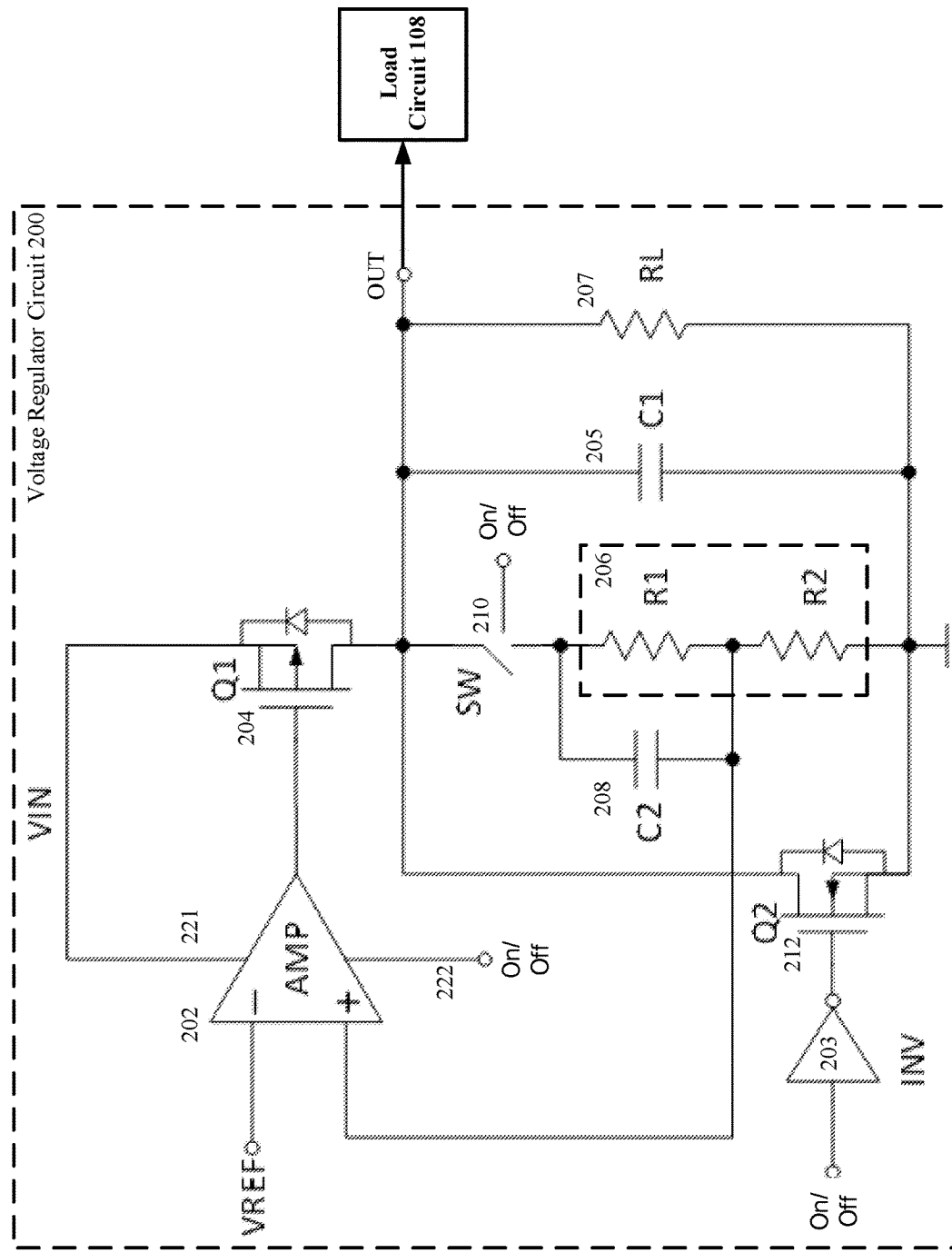
FIG. 2 is a schematic diagram of a power management integrated circuit (PMIC) comprising a voltage regulator circuit, in accordance with some embodiments.

FIG. 2 is a schematic diagram of a voltage regulator circuit 200, in accordance with some embodiments. One application includes the implementation of a computer chip or related integrated circuits. For example, referring to FIG. 2, a power management integrated circuit (PMIC) includes the voltage regulator circuit 200. The PMIC 10 may include a processor core, memory, input/output (I/O), and peripheral components (not shown) that receive power for generating a reference voltage VREF, activation signal ON, and other voltages for powering the voltage regulator circuit 200. The PMIC 10 can be implemented in various automotive, industrial, and consumer applications, and perform various voltage regulation functions. The voltage regulator circuit 200 is constructed and arranged to control an output to a load circuit, e.g., load circuit 108 shown in FIG. 1. In some embodiments, the voltage regulator circuit 200 includes an amplifier 202, a feedback circuit including a voltage divider 206 and a feedforward capacitor 208, a first switch 210, and an active discharging transistor 212.

In some embodiments, the first switch 210 can include a transistor or the like that turns on and off, which is activated when a first signal (ON) is received corresponding to an on state, and turns off when a second signal (OFF) is received. The first switch 210 has an input connected to the output (OUT) of the voltage regulator circuit 200. Accordingly, when the regulator circuit 200 is in an OFF state, the first switch 210 turns off to minimize the noise from the output (OUT) of the of the voltage regulator circuit 200.

In some embodiments, the amplifier 202 is a differential error amplifier having an inverting input terminal for directly receiving a reference voltage $V_{REF}$ and a non-inverting input terminal coupled to the voltage divider 206. In some embodiments, the voltage divider 206 includes resistors R1 and R2 for adjusting the output of the amplifier 202 to any voltage greater than or equal to the reference voltage $V_{REF}$ and providing a feedback signal so that the amplifier 202 can control its output according to the differential between the reference voltage $V_{REF}$ and the feedback signal received at the non-inverting input terminal. The amplifier 202 can amplify the input voltage with an amplification factor set according to the ratio of the first resistor R1 to the second resistor R2 of the voltage divider 206 and feedforward capacitor 208.

In some embodiments, the amplifier 202 also includes a voltage supply input 221 and a switching or on/off signal 222 coupled to a second switch 204, e.g., a drain of a MOSFET (Metal Oxide Semiconductor Field Effect Transistor), and a voltage source providing the first signal (ON/OFF) respectively. The second switch 204 is at the output of the amplifier 202. The amplifier 202 controls the gate of the second switch 204 by way of a negative feedback loop extending from the output. In some embodiments, the second switch 204 includes a p-channel FET transistor or other power MOSFET circuit biased directly from an input voltage (VIN) input to the amplifier 202. In some embodiments, the gate terminal of the second switch 204 can receive an error voltage output from the differential amplifier 202 based on the voltage difference between the reference voltage $V_{REF}$ and voltage output from a feedback circuit comprising the resistors R1, R2 of the voltage divider 206 and the feedforward capacitor 208.

The feedforward capacitor 208 is part of the feedback circuit and constructed and arranged to be coupled to the positive input of the amplifier 202. The feedforward capacitor 208 is coupled to the junction between resisters R1 and R2 to be in parallel with resistor R1 of the voltage divider 206, which is likewise coupled to the positive input of the amplifier 202 to provide improved loop stability to the circuit. During operation, the feedforward capacitor 208 contributes to the output falling slope of the output. The feedforward capacitor 208 affects the frequency stability and fast transient response during a normal operation or load transient. In the absence of the capacitor 208, the frequency compensation of the loop and fast transient response are affected.

The active discharging transistor 212 can be coupled between the second switch 204 and the regulator output OUT parallel with a capacitor 205 and resistor 207, which can discharge the capacitor in connection with the voltage divider 206. In some embodiments, the active discharging transistor 212 can discharge the capacitor 205 regardless of the switch 210 if the second switch 204 is in an off state. The active discharging transistor 212 can discharge an output of the regulator 200 when the regulator is turned off, or in an OFF state. In some embodiments, an inverter 203 provides an input to the gate of the active discharging transistor 212, in particular inverting an ON signal that is also output to the first switch 210 and amplifier 202. Accordingly, the inverter 203 inverts the ON signal to the active discharging transistor 212. In doing so, in some embodiments, the gate of the active discharging transistor 212 receives a '0' value when the first switch 210 and amplifier 202 receive a '1' value of the ON signal. Also, when the regulator circuit 200 is inactivated, e.g., when the first switch 210 and amplifier 202 receive a '0' value of the ON signal, the active discharging transistor 212 receives a '1' value and is activated discharge the output of the regulator 200.

Figure 3:
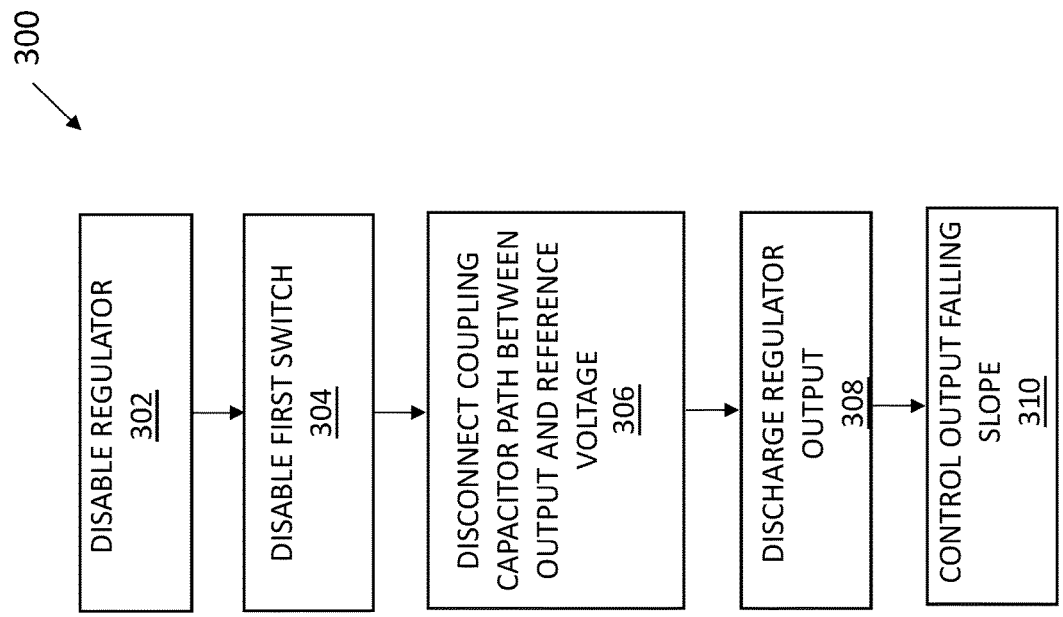
FIG. 3 is a flowchart showing an example sequence of operations for reducing kickback noise for an amplifier circuit, in accordance with some embodiments.

FIG. 3 is a flowchart showing an example sequence of operations for reducing kickback noise for an amplifier circuit, in accordance with some embodiments. In describing the method 300, reference may be made to the voltage regulator circuit 200 of FIG. 2.

At block 302, the regulator 200 is turned off, or inactivated. Here, as shown in FIGS. 2 and 4B, the ON signal is applied to the amplifier 202, the first switch 210, and the inverter 203. The regulator 200 can be turned off when the ON signal has a low state, e.g., a 0 value.

At block 304, the first switch 210 is turned off, or open or otherwise inactivated because it receives the same ON signal as the amplifier 202. Accordingly, the amplifier 202 and first switch 210 inactivated and the first switch 210 at the same time, as shown in FIGS. 4B and 4C. Conversely, when the ON signal has a high state, for example, between time T1 and T4 shown in FIGS. 4A-4E, the amplifier 202 and first switch 210 are each in an activated state. The first switch 210 is inactivated, or turns off, to minimize the noise from the output (OUT) of the regulator 200.

At block 306, the coupling capacitor path between the output (OUT) and the reference voltage $V_{REF}$ is disconnected by the first switch 210 before the regulator output is discharged by the active charging transistor 212 (see also FIGS. 4C-4E at time period between T4 and T5). For example, the coupling capacitor path includes the coupling capacitor 208 and resistor R1 connected to the positive input of the amplifier 202.

At block 308, after the coupling capacitor and R1 path is disconnected, the output (OUT) is discharged by the active discharging transistor 212 since the regulator 200 is turned off, shown for example at FIGS. 4C-4E at time period between T4 and T5.

At block 310, the falling slope of the output (OUT), for example, shown at FIG. 4D at time T4 is controlled by the regulator 200 so that during discharging of the active charging transistor 212 when the regulator 200 is turned off the output falling slope affects the reference voltage $V_{REF}$ through the feedforward capacitor 208 and the internal parasitic capacitor between the positive and negative inputs of the amplifier 202. Here, the first switch 210 between the output (OUT) and the feedforward capacitor 208 is disconnected. Accordingly, the falling slope of the electronic signal, e.g., output voltage, at the regulator output (OUT) during the disable, shown at T5 of FIG. 4E, doesn't affect the reference voltage $V_{REF}$.

FIGS. 4A-4E collectively include a timing chart indicating the operation of the voltage regulator circuit 200 of FIG. 2, which as shown in FIG. 4A is performed during a period for which the reference voltage $V_{REF}$ is at a constant high level. FIG. 4 illustrates that there is no effect of kickback noise with respect to the reference voltage $V_{REF}$. During a period for which the first signal (ON) is output at an on state at time T1, the first switch 210 is closed or otherwise activated to form an electronic connection path from the second switch 204 at the output of the amplifier 202 and the voltage divider 206 and the output (OUT). Here, the amplifier 202 is also turned on by the ON signal. Also, at time T2 shown in FIG. 4D, the active discharging transistor 212 is turned off due to a time delay of the inverter 203. As shown in FIG. 4E, at time T3 the rising slope of the output (OUT) occurs. Here the amplifier 202 can control the slew rate of the output. When the regulator 200 is activated, the amplifier 202 is slowly enabled, and therefore, delay time T2 and rise time T3 are determined by the slew rate of the amplifier 202.

At time T4, a second signal (OFF) is output, or the first signal (ON) transitions to a low state. In doing so, the first switch 210 is opened or otherwise inactivated. During a period (T4-T5) in which the second signal (OFF) is output, the open first switch 210 disconnects a coupling capacitor and R1 path between the regulator output (OUT) and the reference voltage ($V_{REF}$), such as the RC circuit 206, 208. Also, at time T5, the active discharging transistor 212 is turned on since the inverter 203 outputs a high value when it receives the second signal (OFF). The inverter 203 causes a time delay (T4-T5). In response to the active discharging transistor 212 outputting a high value, at T5, the regulator output (OUT) transitions from a high state to a low state. However, the falling slope of the signal at the output (OUT), or any noise produced at the output (OUT) does not affect the reference voltage ($V_{REF}$), and instead negates an effect of noise on the reference voltage in response to the falling slope of the output signal. This is due to the coupling capacitor and R1 path between the output (OUT) and the reference voltage ($V_{REF}$) being disconnected by the first switch 210 before the regulator output is discharged by the active discharging transistor 212. More specifically, in some embodiments during discharging, the output falling slope affects to the reference voltage ($V_{REF}$) through the feedforward capacitor 208 and the internal parasitic capacitor between the positive input and the negative input of the amplifier 202. In other words, a signal path extends from the output (OUT) to the active discharging transistor 212, and a path between the output (OUT) via the capacitor 208 to the positive input of the amplifier 202 is disconnected by the open first switch 210. Since the first switch 210 is open, or disconnected, the falling slope of the output (OUT) during the disable does not affect the reference voltage ($V_{REF}$).

As will be appreciated, embodiments as disclosed include at least the following embodiments. In one embodiment, a power management integrated circuit comprises a voltage regulator circuit which comprises a regulator output that outputs an electronic signal having a rising slope and a falling slope; a differential error amplifier that is activated in response to a first signal and inactivated in response to a second signal, the differential error amplifier having a first input for receiving a reference voltage, a second input for receiving a feedback voltage, and an output that in response to the first signal generates a differential with respect to the reference voltage and the feedback voltage; an active discharging transistor that, in response to the falling slope of the electronic signal, discharges a present electronic signal at the regulator output; and a first switch at the output of the differential error amplifier that is in open state in response to a receipt of the second signal to disconnect a coupling capacitor path between the regulator output and the reference voltage to negate an effect of noise on the reference voltage in response to the falling slope of the electronic signal; and a load circuit electrically coupled to the regulator output that receives a regulated voltage corresponding to the reference voltage having the reduced source of noise.

Alternative embodiments of the power management integrated circuit include one of the following features, or any combination thereof.

The power management integrated circuit further comprises a second switch having a gate terminal coupled to the output of the differential error amplifier, a source terminal that shares a common input voltage with the differential error amplifier, and a drain terminal coupled between the first switch and the regulator output. The second switch (204) includes a power metal oxide semiconductor field effect transistor (MOSFET).

The power management integrated circuit further comprises a feedback circuit comprising a voltage divider and a feedforward capacitor that generates a feedback signal that is output to the differential error amplifier for controlling the output according to a differential between the reference voltage and the feedback signal.

The voltage divider includes a first resistor and a second resistor for adjusting the output of the differential error amplifier to a voltage greater than or equal to the reference voltage.

The feedforward capacitor is coupled between a positive input of the differential error amplifier and a junction between the first and second resisters to be in parallel with the first resistor of the voltage divider, which is likewise coupled to the positive input of the differential error amplifier.

The feedforward capacitor contributes to the falling slope of the electronic signal without affecting the reference voltage.

The voltage regulator circuit further comprises a capacitor and a resistor in parallel with the first switch and the voltage divider coupled in series, wherein the active discharging transistor discharges the capacitor when the voltage regulator circuit is inactivated.

The power management integrated circuit further comprises a coupling capacitor path between the regulator output and the reference voltage, the coupling capacitor path including the feedforward capacitor and the first resistor connected to the second input of the differential error amplifier, wherein the coupling capacitor path is disconnected by the first switch before the regulator output is discharged by the active charging transistor.

The falling slope of the electronic signal affects the reference voltage through the feedforward capacitor and the internal parasitic capacitor between the first and second inputs of the amplifier, and wherein when the first switch is in the open state the reference voltage is unaffected by the output voltage.

In another embodiment, a voltage regulator circuit of a power management integrated circuit comprises a regulator output that outputs an electronic signal having a rising slope and a falling slope; a differential error amplifier that is activated in response to a first signal and inactivated in response to a second signal, the differential error amplifier having a first input for receiving a reference voltage, a second input for receiving a feedback voltage, and an output that in response to the first signal generates a differential with respect to the reference voltage and the feedback voltage; an active discharging transistor that, in response to the falling slope of the electronic signal, discharges a present electronic signal at the regulator output; and a first switch at the output of the differential error amplifier that is in open state in response to a receipt of the second signal to disconnect a coupling capacitor path between the regulator output and the reference voltage to negate an effect of noise on the reference voltage in response to the falling slope of the electronic signal; and a load circuit electrically coupled to the regulator output that receives a regulated voltage corresponding to the reference voltage having the reduced source of noise.

Alternative embodiments of the voltage regulator circuit include one of the following features, or any combination thereof.

The voltage regulator circuit further comprises a second switch having a gate terminal coupled to the output of the differential error amplifier, a source terminal that shares a common input voltage with the differential error amplifier, and a drain terminal coupled between the first switch and the regulator output. The second switch (204) includes a power metal oxide semiconductor field effect transistor (MOSFET).

The voltage regulator circuit further comprises a feedback circuit comprising a voltage divider and a feedforward capacitor that generates a feedback signal that is output to the differential error amplifier for controlling the output according to a differential between the reference voltage and the feedback signal.

The voltage divider includes a first resistor and a second resistor for adjusting the output of the differential error amplifier to a voltage greater than or equal to the reference voltage.

The feedforward capacitor is coupled between a positive input of the differential error amplifier and a junction between the first and second resisters to be in parallel with the first resistor of the voltage divider, which is likewise coupled to the positive input of the differential error amplifier.

The feedforward capacitor contributes to the falling slope of the electronic signal without affecting the reference voltage.

The voltage regulator circuit further comprises a capacitor and a resistor in parallel with the first switch and the voltage divider coupled in series, wherein the active discharging transistor discharges the capacitor when the voltage regulator circuit is inactivated.

The voltage regulator circuit further comprises a coupling capacitor path between the regulator output and the reference voltage, the coupling capacitor path including the feedforward capacitor and the first resistor connected to the second input of the differential error amplifier, wherein the coupling capacitor path is disconnected by the first switch before the regulator output is discharged by the active charging transistor.

The falling slope of the electronic signal affects the reference voltage through the feedforward capacitor and the internal parasitic capacitor between the first and second inputs of the amplifier, and wherein when the first switch is in the open state the reference voltage is unaffected by the output voltage.

In another embodiment, method for noise reduction of a voltage regulator circuit comprises disabling the voltage regulator circuit; turning a first switch at an output of the voltage regulator circuit to an off position; discharging, by an active discharging transistor coupled to the output of the voltage regulator circuit, an electronic signal; and disconnecting the first switch 210 a coupling capacitor path between the output and a reference voltage at an input of the voltage regulator circuit before the regulator output is discharged by the active charging transistor.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A voltage regulator circuit, comprising:
   a regulator output configured to output an electronic signal having a rising slope and a falling slope;
   a differential error amplifier configured to be activated in response to a first signal and inactivated in response to a second signal,
   wherein the differential error amplifier includes a first input configured to receive a reference voltage, a second input configured to receive a feedback voltage, and an output configured to generate a differential error signal based on the reference voltage and the feedback voltage in response to the first signal;
   an active discharging transistor configured to discharge the electronic signal at the regulator output in response to the first and second signals; and
   a first switch coupled to the regulator output and configured to be in an open state in response to the second signal;
   wherein the first switch is configured to disconnect a coupling capacitor path between the regulator output and the second input of the differential error amplifier in response to the falling slope of the electronic signal.

2. The voltage regulator circuit of claim 1, further comprising
   a second switch having a gate terminal coupled to the output of the differential error amplifier, a source terminal that shares a common input voltage with the differential error amplifier, and a drain terminal coupled to the first switch and the regulator output.

3. The voltage regulator circuit of claim 2,
   wherein the second switch is a metal oxide semiconductor field effect transistor (MOSFET).

4. The voltage regulator circuit of claim 1,
   wherein the coupling capacitor path includes a feedforward capacitor;
   further comprising a voltage divider having a first resistor coupled in parallel with the feedforward capacitor, and having a second resistor.

5. The voltage regulator circuit of claim 4,
   wherein the voltage divider is configured to adjust the output of the differential error amplifier to a voltage greater than or equal to the reference voltage.

6. The voltage regulator circuit of claim 5,
   wherein the feedforward capacitor is coupled between the second input of the differential error amplifier and a junction between the first and second resistors.

7. The voltage regulator circuit of claim 4,
   wherein the feedforward capacitor is configured to contribute to the falling slope of the electronic signal without affecting the reference voltage.

8. The voltage regulator circuit of claim 5,
   wherein the active discharging transistor is configured to discharge the feedforward capacitor when the voltage regulator circuit is inactivated in response to the second signal.

9. The voltage regulator circuit of claim 4,
   wherein the coupling capacitor path is disconnected by the first switch before the regulator output is discharged by the active charging transistor.

10. The voltage regulator circuit of claim 4,
    wherein the falling slope of the electronic signal affects the reference voltage through the feedforward capacitor and an internal parasitic capacitor between the first and second inputs of the amplifier, and
    wherein when the first switch is in the open state the reference voltage is unaffected by the output voltage.

11. A voltage regulator circuit embedded in a power management integrated circuit, comprising:
    a regulator output configured to output an electronic signal having a rising slope and a falling slope;
    a differential error amplifier configured to be activated in response to a first signal and inactivated in response to a second signal, wherein the differential error amplifier includes a first input configured to receive a reference voltage, a second input configured to receive a feedback voltage, and an output configured to generate a differential error signal based on the reference voltage and the feedback voltage in response to the first signal;

an active discharging transistor configured to discharge the electronic signal at the regulator output in response to the first and second signals; and a first switch coupled to the regulator output and configured to be in an open state in response to the second signal;

wherein the first switch is configured to disconnect a coupling capacitor path between the regulator output and the second input of the differential error amplifier in response to the falling slope of the electronic signal.

12. The voltage regulator circuit of claim 11, further comprising a second switch having a gate terminal coupled to the output of the differential error amplifier, a source terminal that shares a common input voltage with the differential error amplifier, and a drain terminal coupled to the first switch and the regulator output.

13. The voltage regulator circuit of claim 11, wherein the coupling capacitor path includes a feedforward capacitor;

further comprising a voltage divider having a first resistor coupled in parallel with the feedforward capacitor, and having a second resistor.

14. The voltage regulator circuit of claim 13, wherein the voltage divider i is configured to adjust the output of the differential error amplifier to a voltage greater than or equal to the reference voltage.

15. The voltage regulator circuit of claim 14, wherein the feedforward capacitor is coupled between the second input of the differential error amplifier and a junction between the first and second resistors.

16. The voltage regulator circuit of claim 13, wherein the feedforward capacitor is configured to contribute to the falling slope of the electronic signal without affecting the reference voltage.

17. The voltage regulator circuit of claim 13, wherein the active discharging transistor is configured to discharge the feedforward capacitor when the voltage regulator circuit is inactivated in response to the second signal.

18. The voltage regulator circuit of claim 11, wherein the coupling capacitor path is disconnected by the first switch before the regulator output is discharged by the active charging transistor.

19. The voltage regulator circuit of claim 13, wherein the falling slope of the electronic signal affects the reference voltage through the feedforward capacitor and an internal parasitic capacitor between the first and second inputs of the amplifier, and wherein when the first switch is in the open state the reference voltage is unaffected by the output voltage.

20. A method for noise reduction of a voltage regulator circuit, comprising:

disabling the voltage regulator circuit;

turning a first switch at an output of the voltage regulator circuit to an off position;

discharging, by an active discharging transistor coupled to the output of the voltage regulator circuit, an electronic signal; and disconnecting with the first switch a coupling capacitor path between the output of the voltage regulator circuit and a reference voltage at an input of the voltage regulator circuit before the regulator output is discharged by the active discharging transistor.

* * * * *